Sept. 12, 1967      M. S. ROCKOFF      3,341,762

BOOST SUPPLY WITH POLARITY PROTECTION

Filed March 15, 1965      2 Sheets-Sheet 1

INVENTOR.
MYER S. ROCKOFF
BY

INVENTOR.
MYER S. ROCKOFF

# United States Patent Office 3,341,762
Patented Sept. 12, 1967

3,341,762
BOOST SUPPLY WITH POLARITY PROTECTION
Myer S. Rockoff, 38 Pine Hill Road,
Swampscott, Mass. 01907
Filed Mar. 15, 1965, Ser. No. 439,810
4 Claims. (Cl. 320—6)

This invention relates to electrical apparatus and more particularly to an electrical apparatus for use in service vehicles having a service battery, an auxiliary battery and cabling means for connecting the two batteries in parallel with the battery in a disabled vehicle.

During the winter months in the northern climates, automobile and truck batteries are subjected to severe operating conditions. Frequent cold weather engine starts impose a heavy current drain upon the batteries and with the relatively short daylight driving hours, the batteries rarely have an opportunity to be recharged to their fully charged state. The results of such operating conditions upon the life of a battery are well known to the many motorists who have experienced a "dead" battery. The usual procedure in such circumstances is to call for a tow truck or service vehicle to "jump start" the disabled automobile by connecting a fully charged battery from the service vehicle in parallel with the automobile's "dead" battery.

Service vehicles generally carry a separate or auxiliary battery specifically for the purpose of "jump starting" disabled vehicles. In order to keep the auxiliary battery fully charged at all times, many service stations mount the auxiliary battery in a portable carrying case so that the battery can be removed from the service vehicle between service calls and placed on a battery charger. This procedure is not only inconvenient during periods of extremely cold weather when service calls occur quite frequently, but it also may not be effective if there is not enough time between service calls to fully recharge the battery at the service station.

In an attempt to solve this problem, some service stations have floated the auxiliary battery across the service vehicle's generator so that the auxiliary battery will be charged while the vehicle is driving between service calls. This procedure is effective only if adequate electrical isolation is provided between the service vehicle's normal battery and the auxiliary battery in order to prevent current flow between the batteries if the batteries are not equally charged. Various types of rather complicated switching systems have been devised to provide the required electrical isolation between the two service vehicle batteries. However, such systems are subject to operator error and at best are rather cumbersome. Furthermore, in addition to maintaining electrical isolation between the service vehicle batteries, the operator must also maintain proper polarity between the service vehicle batteries and the "dead" battery in the disabled vehicle. This problem was not too serious until the introduction of alternators in cars and trucks imposed a heavy penalty upon the service operator who made a mistake in battery polarities when connecting the jumper cables. With alternator equipped electrical systems, even a momentary reversed polarity battery connection was sufficient to burn out the relatively expensive alternator semiconductor diodes.

It is accordingly an object of the present invention to provide an electrical apparatus for installation in service vehicles, which will automatically prevent the electrical interconnection of service vehicle batteries and a "jumped" battery if the battery polarities are reversed.

It is another object of the present invention to provide a visual indication of a potential polarity reversal before any electrical connections are made between the two vehicle batteries.

It is still another object of the invention to maintain the batteries in the service vehicle in a charged state and to provide automatic electrical isolation therebetween.

It is a feature of the present invention that front panel meters are provided for monitoring the normal charging and discharging currents of the service vehicle batteries and for measuring the starting current supplied to the disabled vehicle.

It is another feature of the present invention that the interconnection of the batteries in the disabled vehicle and the service vehicle can be accomplished electrically and at a location remote from the service vehicle.

It is still another feature of the invention that the electrical circuitry provided for interconnecting the service vehicle batteries in parallel with the disabled vehicle battery also can be employed to connect both service vehicle batteries in parallel with the service vehicle starter motor for boosted starting power under adverse starting conditions.

It is a further object of the invention to provide selectively operable switch means for energizing the battery interconnecting circuitry from either the disabled vehicle battery or the service vehicle batteries.

It is still a further object of the invention to provide an electrical apparatus which is operable with disabled cars having either six or twelve volt batteries.

These objects and other objects and features of the present invention will be apparent from the following description of a preferred embodiment thereof, selected for purposes of illustration and shown in the accompanying drawings in which.

Figure 1:
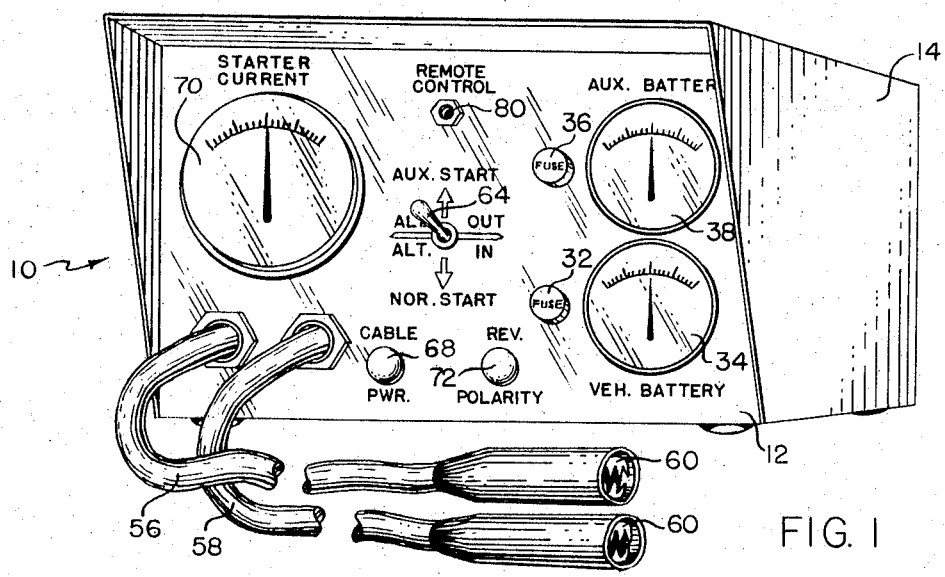
FIG. 1 is a perspective view of the apparatus showing the front panel controls, monitoring equipment and indicator lights.

Turning now to the drawings and particularly to FIG. 1 thereof, there is shown in perspective view an electrical apparatus constructed in accordance with the present invention and indicated generally by reference numeral 10. Although the electrical apparatus of the present invention will be described with respect to a service vehicle and a disabled car, it should be understood that this use is merely illustrative and that the invention is not limited to this particular example, but instead, can be employed in many other fields including marine and aeronautical applications.

The components of the electrical apparatus 10, described hereinafter in greater detail, are mounted on a chassis 12 to which is secured a removable cowl panel cover 14. The purpose and function of the front panel meters, indicator lamps and control switches can best be understood by examining the perspective view of the apparatus depicted in FIG. 1 in connection with the schematic and partial block diagram thereof shown in FIG. 2. For purposes of clarity, the service vehicle's regular equipment is shown outside of the dashed lines in FIG. 2 while the components of the present invention are shown within the dashed lines. Each service vehicle normally carries a regular service battery 16 which operates the usual complement of equipment i.e., starter motor, ignition system, headlights, interior lights, cigarette lighter, etc., which are collectively identified by the box numbered 18. In addition, most service vehicles carry an auxiliary battery 20 to power the service vehicle's auxiliary equipment 22 which may include such items as a power hoist, two-way radio communications set and similar heavy drain, but infrequently used equipment.

Figure 2:
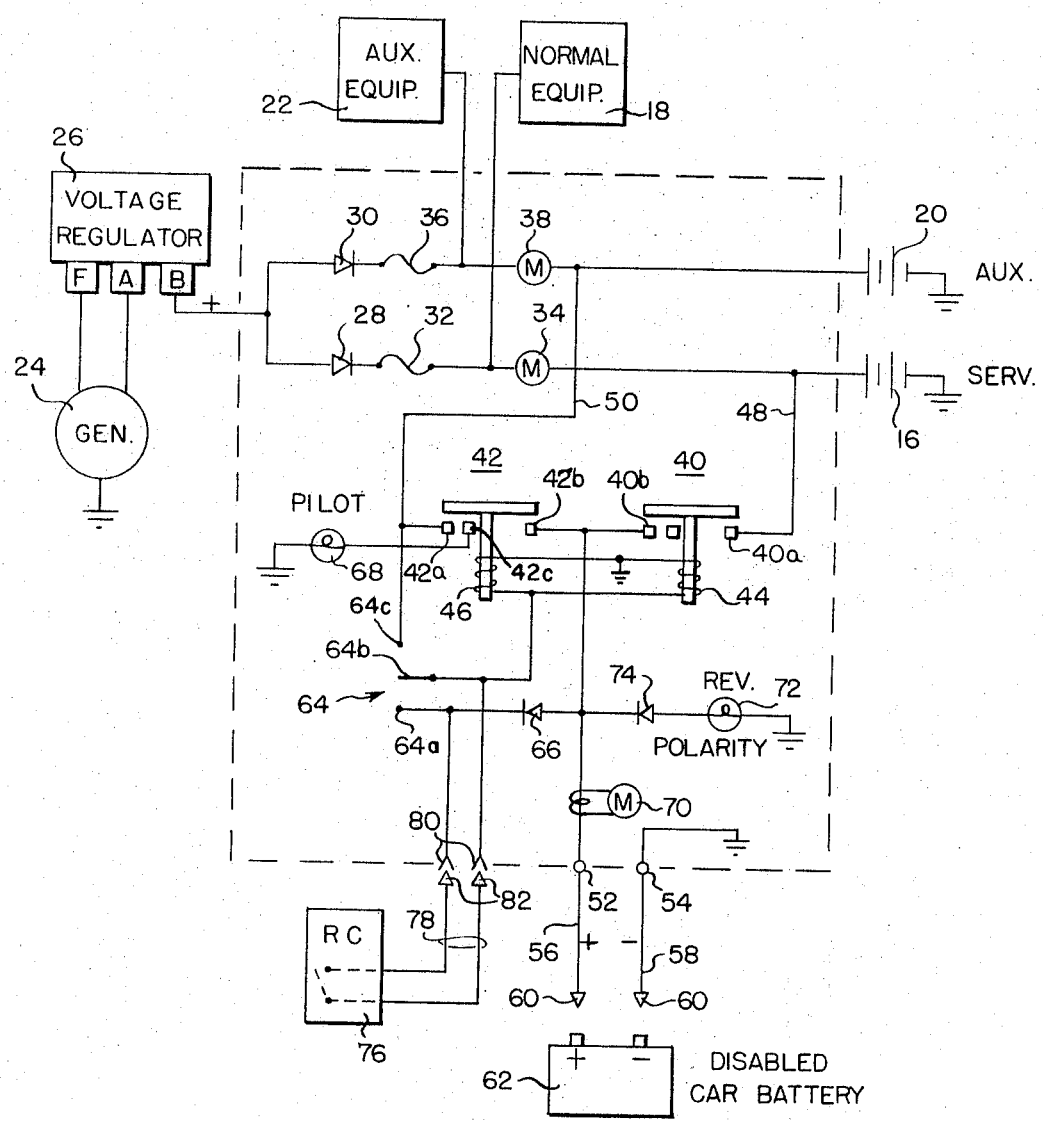
FIG. 2 is a schematic and partial block diagram of the apparatus depicted in FIG. 1.

The service and auxiliary batteries 16 and 20 are maintained at the proper state of charge by the service vehicle's generator and voltage regulator which are shown representationally in FIG. 2 and identified by numerals 24 and 26, respectively. It has been mentioned previously that one of the objects of the present invention is to provide electrical isolation between the service vehicle's service battery 16 and auxiliary battery 20 in order to prevent unwanted current flow between the batteries in the event that the batteries are not equally charged. The required electrical isolation is obtained by utilizing two semiconductor diodes 28 and 30 which are connected back-to-back i.e., like poled in the battery charging circuit. The charging circuit for the service vehicle's service battery 16 comprises semiconductor diode 28, a series connected fuse 32 and a series connected "zero center" ammeter 34 which provides a visual indication of the charging and discharging currents of the service battery. The auxiliary battery 20 has a similar charging circuit including semiconductor diode 30, fuse 36 and an identical front panel mounted, "zero center" ammeter 38.

Assuming that the service and auxiliary vehicle's batteries 16 and 20, respectively, have been maintained in a suitably charged condition by the charging circuit described above, the two service vehicle batteries can be used to "jump" start a disabled vehicle. The interconnection of the service vehicle's batteries in parallel with the disabled car battery is accomplished electrically through two conventional starter-type relays 40 and 42, whose energization circuits are provided with an electronic safety mechanism, hereinafter described, to prevent an accidental reversed polarity interconnection of the batteries. The relays 40 and 42 each have a set of heavy duty, normally open contacts, indicated as 40a–40b and 42a–42b, which are closed upon energization of the respective relay coils 44 and 46. Relay contacts 40a and 42a are electrically connected to the positive terminals of the service and auxiliary batteries through heavy duty copper cables 48 and 50, respectively. The two other relay contacts, 40b and 42b, are electrically connected to a common output terminal 52 which in actual wiring practice may comprise one of the threaded stud connectors or cable tie points found on conventional starter relays.

Since output terminal 52 is connected to the positive terminals of the service vehicle's batteries whenever relays 40 and 42 are energized, it will be referred to hereinafter as the "positive" output terminal. A second or "negative" output terminal 54 is electrically connected to chassis 12 which provides a common ground for the components shown within the dashed lines in FIG. 2. It should be noted that in a negative ground system, as shown in FIG. 2, the chassis 12 is at the same negative potential as the service vehicle ground so that the normal polarity of the output terminals 52 and 54 will be positive and negative, respectively.

Two insulated, heavy duty jumper cables 56 and 58 are connected at one end to the positive and negative output terminals 52 and 54, respectively, and have at the other end suitable means, such as for example, color coded electrically insulated alligator clips 60 (FIG. 1) for detachably securing the jumper cables to the positive and negative terminals of a disabled car battery 62.

Having described the electrical components and specific circuitry for connecting the service vehicle's service and auxiliary batteries in parallel with the disabled car battery, I will now describe the operation of the relay coil energization circuits and the electronic safeguards provided therein to prevent an accidental reversed polarity connection of the aforementioned batteries. Looking at FIG. 1, the service vehicle's operator can select either one of the two methods of energizing the starter relay coils 44 and 46 by means of a front panel mounted single pole, double throw, center "off" starting switch 64. In the "normal" starting mode or down position of the switch, as shown in FIG. 1, alternator protection is provided so that if the jumper cables 56 and 58 are accidentally connected to the wrong polarity terminals on the disabled car battery 62, relay coils 44 and 46 will not be energized when the starter switch 64 is thrown from its center "off" position to the down or "normal" starting position. The circuitry which prevents the energization of the starter relay coils if the jumper cables are connected with reversed polarity, is shown in FIG. 2 and will now be described.

For the purposes of understanding the alternator protection circuitry, it will be helpful to first assume that the jumper cables are correctly connected i.e., the positive and negative jumper cables 56 and 58 are connected to the corresponding polarity terminals on the disabled car battery 62. It will be appreciated that as soon as the jumper cables are connected to the disabled car battery 62, a positive potential will be applied to the anode of an alternator protector diode 66. When the starter switch 64 is thrown to the "normal" starting position, the cathode of diode 66 is grounded through starter switch contacts 64a and 64b and the parallel connected relay coils 44 and 46. Since the alternator protector diode 66 is now forward biased, current will flow through the circuit comprising grounded cable 58, battery 62, cable 56, diode 66 and the relay coils 44 and 46 thereby energizing relays 40 and 42.

The energization of relays 40 and 42 closes the normally open relay contacts 40a–40b and 42a–42b which connect the service vehicle's batteries 16 and 20 in parallel with the disabled car battery 62. A separate contact 42c on relay 42c is used to energize a front panel mounted pilot lamp 68 which provides a visual indication that the jumper cables 56 and 58 are "hot." When the starter switch in the disabled car (not shown) is actuated, the parallel connected service vehicle batteries provide boosted starting power for the disabled vehicle. The total amount of current drawn from the service vehicle batteries by the disabled car's starter motor (not shown) is measured by a front panel mounted starter current ammeter 70. The starter current ammeter 70 is inductance coupled to jumper cable 56 and provides a quantitative indication of any malfunction in the starting circuit in the disabled vehicle.

Now consider the situation when the jumper cables 56 and 58 have been accidentally connected to the opposite polarity terminals of the disabled vehicle battery 62. Instead of a positive potential being applied to the anode of the alternator protector diode 66, as described above, the applied potential will be negative with respect to ground. If the starter switch 64 is thrown to the "normal" starting position, the cathode will be grounded through starter switch contacts 64a and 64b. However, the chassis ground will be at a positive potential relative to the potential applied to the anode of the alternator diode 66. In this condition, diode 66 is reverse biased and no current will flow through the relay coils 44 and 46 even though the starter switch 64 has been thrown to the "start" position.

A visual indication of the reversed polarity connection of the jumper cables 56 and 58 is provided by a front panel mounted "reverse polarity" indicator lamp 72 that is series connected with a semiconductor diode 74 across the positive and negative output terminals 52 and 54. Semiconductor diode 74 is poled so that conduction in the forward direction will occur only when a "negative" potential with respect to ground is applied to the "positive" output terminal 52. Since this condition occurs only when the jumper cables are reversed, the reverse polarity diode 74 functions as an automatic current control for the reverse polarity indicator lamp 72. It should be noted that the visual warning of a reversed polarity condition will be given by lamp 72 as soon as the jumper cables 56 and 58 are connected to the disabled car battery 62 thus providing the service vehicle operator with a warning of the reversed polarity condition, prior to operating the starter switch 64.

The visual warning of a reversed polarity condition before the relays 40 and 42 are energized is one of the features of my invention. The importance of this feature will be fully appreciated from the following discussion of the second method of energizing the starter relay coils 44 and 46. The second or alternate starting method is used whenever the disabled car battery is too weak to energize the relay coils. Referring to FIGS. 1 and 2, the pole contact 64b of the starter switch is connected to the positive terminal of the auxiliary battery 20 through starter switch contact 64c when the switch is placed in the "up" or auxiliary starting position. In this position, the auxiliary battery provides the necessary current to energize the starter relay coils 44 and 46. It will be apparent that if this method is employed to energize the starter relay coils, there is no electronic means, as described above, to prevent the energization of relays 40 and 42 in the event that the jumper cables 56 and 58 have been connected to the wrong polarity terminals of the disabled car battery 62. However, as mentioned previously, the reversed polarity indicator lamp 72 will be illuminated as soon as the jumper cables are connected to the disabled car battery. Thus when the service vehicle operator returns to the service vehicle to actuate the starter switch 64, the reverse polarity indicator lamp 72 will provide an advance visual warning of the reversed polarity condition.

While the primary purpose of the auxiliary starting position of the starter switch 64 is to provide a means for energizing the starter relay coils 44 and 46 whenever the battery in the disabled vehicle is too weak, the auxiliary starting position can also be used in two other situations which, although not occurring frequently, are encountered enough times to make it desirable to have a certain degree of flexibility in the operation of the equipment. The first situation is encountered when the disabled vehicle has a six volt electrical system. Since starter relays 40 and 42 are designed to work on a twelve volt system, normally the six volts supplied from the disabled car battery will not be sufficient to energize the starter relay coils 44 and 46. In this case, the energization current for the relay coils can be drawn from the auxiliary battery 20 by utilizing the auxiliary starting position of starter switch 64. In addition, the auxiliary starting position can also be used in the unlikely event that the service vehicle's regular battery 16 is too discharged to start the service vehicle. By throwing the starter switch 64 to the auxiliary or "up" position, the service vehicle's auxiliary battery 20 is connected in parallel with the weak service battery 16 thereby providing boosted starting power for the service vehicle's starting motor (not shown).

The flexibility and operational convenience of my invention is further enhanced by providing means for energizing the starter relays 40 and 42 from a remote position. The remote control function is provided by a single pole, single throw, remote control switch 76 which is connected across contacts 64a and 64b of the starter switch 64, as shown in FIG. 2. The remote control switch 76 functions in the same manner as the starter switch 64 when the starter switch is thrown to its down or "normal" starting position. It will be appreciated that full alternator protection is provided during the remote control operation of the starter relays 40 and 42. For the convenience of the service vehicle operator, the interconnecting wires 78 from the remote control switch 76 to the starter switch contacts 64a and 64b can be disconnected from the electrical apparatus 10 by means of a conventional plug and jack arrangement. A suitable jack 80 is mounted on the front panel of the apparatus and receives, in frictional engagement and electrical contact, a corresponding mating plug 82 which is shown representationally in FIG. 2.

Figure 3:
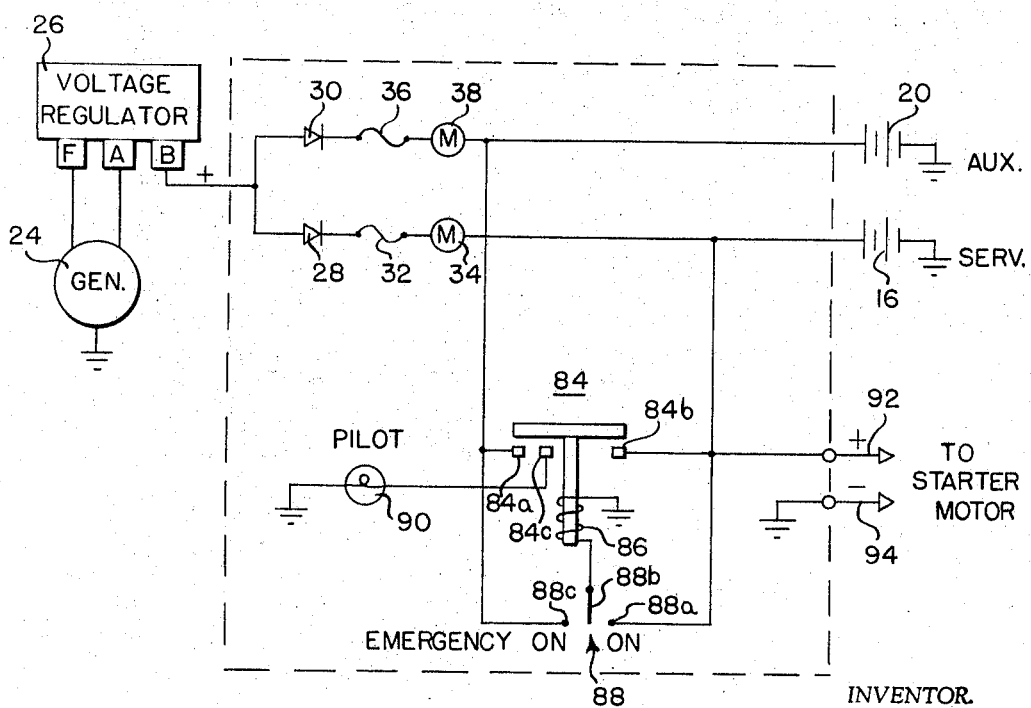
FIG. 3 is a schematic and partial block diagram of a modification of the invention.

Turning now to FIG. 3, there is shown in schematic and partial block diagram form a modification of the electrical apparatus 10 for use in vehicles having both a service battery for normal operation and an auxiliary battery for emergency starting and running. Typically, such vehicles may include pleasure and commercial vessels having an electrical starting system for the vessel's inboard or outboard engines. For safety purposes, these vessels normally carry a spare or auxiliary battery to provide electrical power in an emergency situation. The modification of my invention depicted in FIG. 3 is designed to maintain both batteries in a fully charged condition with complete electrical isolation provided between the batteries without sacrificing the ability to electrically interconnect the batteries in parallel with the vessel's starter motor. Since the components shown in FIG. 3 are essentially the same as those depicted in FIG. 2 and described above, the same numbers will be employed in FIG. 3 with respect to the corresponding circuit components.

The charging circuit for the vessel's regular service battery 16 and auxiliary battery 20 are identical with these depicted in FIG. 2 and described above. A single, conventional starter-type relay 84 having a relay coil 86 and normally open contacts 84a and 84b is employed to connect the two batteries in parallel with the ship's starter motor (not shown). Energization of the relay coil 86 is accomplished by means of a two positioned panel mounted starter switch 88. In the normal "on" position of the starter switch, the relay coil is connected in parallel with the service battery 16 through starter switch contacts 88a and 88b. The relay contacts 84a and 84b are closed upon energization of the relay and connect the two batteries 16 and 20 in parallel. At the same time, a separate relay contact 84c energizes pilot lamp 90 to provide a visual indication of the energization of output cables 92 and 94 which are connected to the ship's starter motor. If the ship's regular service battery 16 is too discharged to energize the relay coil 86, the starting switch 88 can be thrown to the "emergency on" position in which the auxiliary battery 20 provides the necessary current for energizing relay coil 86 through switch contacts 88b and 88c.

From the foregoing description it will now be apparent to those skilled in the art that numerous minor variations of the preferred embodiments of my invention herein shown, are possible, and accordingly, it is not my intention to confine the invention to the precise form shown herein, but rather to limit it in terms of the appended claims.

Having thus described and disclosed a preferred embodiment of my invention, what I claim is new and desire to secure by Letters Patent in the United States is:

1. An electrical apparatus for use in equipment having a service battery, an auxiliary battery and means for charging the batteries, said apparatus comprising: electrical means for preventing current flow between the batteries during discharging operations; selectively operable means for connecting said batteries in parallel with another circuit having a source of direct current potential, said means being energized by said direct current potential; reverse polarity indicator means; and polarity sensitive means for preventing the operation of said connecting means whenever the polarities of said batteries and said other circuit are reversed.

2. An electrical apparatus for use in equipment having a service battery, an auxiliary battery and means for charging the batteries, said apparatus comprising: like poled semiconductor diodes in the charging circuits for said batteries; first and second electrical relays each having a set of normally open contacts in series with said service and auxiliary batteries, respectively; another circuit having a source of direct current potential; switch means for energizing both of said relays; reverse polarity indicator means; and means for preventing the energization of said relays whenever the polarities of said batteries and said other circuit are reversed.

3. An electrical apparatus for use in equipment having a service battery, an auxiliary battery and means for charging the batteries, said apparatus comprising: a charging circuit for each of said batteries including a semiconductor diode, said diodes being like poled; first and second electrical relays each having a set of normally open contacts in series with said service and auxiliary batteries, respectively, another circuit having a source of direct current potential; a single pole, center-off double throw switch having the pole contact thereof connected to the coils of said relays with one throw contact connected to said auxiliary battery and the other throw contact connected through a semiconductor diode to said source of direct current potential; and a series connected semiconductor diode and reverse polarity lamp in parallel with said source of direct current potential.

4. In a service vehicle having a service battery, an auxiliary battery and means for charging said batteries, an electrical apparatus comprising: like poled semiconductor diodes in the charging circuits for said batteries; first and second relays each having a set of normally open contacts in series with a positive output terminal and the positive terminals of said service and auxiliary batteries respectively; a negative output terminal connected to the negative terminals of said batteries; a single pole, center-off, double throw switch having the pole contact thereof connected to the coils of said relays with one throw contact connected to the positive terminal of said auxiliary battery and the other throw contact connected to the cathode of a semiconductor diode whose plate is connected to said positive output terminal; a semiconductor diode and reverse polarity indicator lamp series connected between said output terminals with the cathode of said diode connected to said positive output terminal; and cable means for connecting said output terminals to the battery in a disabled vehicle.

References Cited
UNITED STATES PATENTS

| | | | |
|---|---|---|---|
| 2,675,490 | 4/1954 | Portail | 307—48 |
| 2,866,907 | 12/1958 | Gebhard | 320—15 X |
| 2,926,266 | 2/1960 | Porter | 290—36 X |
| 2,998,776 | 9/1961 | Morgan | 320—15 X |
| 3,062,998 | 11/1962 | Medlar | 320—25 X |
| 3,258,672 | 6/1966 | Godshalk et al. | 320—25 |

JOHN F. COUCH, *Primary Examiner.*

S. WEINBERG, *Assistant Examiner.*